United States Patent [19]

Yui et al.

[11] Patent Number: 5,868,822
[45] Date of Patent: Feb. 9, 1999

[54] INK-JET RECORDING INK AND INK-JET RECORDING METHOD USING THE SAME

[75] Inventors: Toshitake Yui; Hitoshi Kojima; Ken Hashimoto, all of Minami-ashigara; Katsuhide Ogawa, Ebina, all of Japan

[73] Assignee: Fuji Xerox Co., Ltd., Tokyo, Japan

[21] Appl. No.: 726,859

[22] Filed: Oct. 4, 1996

[30] Foreign Application Priority Data

Oct. 18, 1995 [JP] Japan .................................. 7-270072

[51] Int. Cl.$^6$ ..................................................... C09D 5/00
[52] U.S. Cl. .................... 106/31.26; 106/31.27; 106/31.28; 106/31.57; 523/161
[58] Field of Search ............... 106/31.26, 31.27, 106/31.28, 31.59; 523/161

[56] References Cited

U.S. PATENT DOCUMENTS

| | | | |
|---|---|---|---|
| 4,279,653 | 7/1981 | Makishima et al. | 106/22 |
| 4,508,570 | 4/1985 | Fujii et al. | 106/20 |
| 4,985,077 | 1/1991 | Ise et al. | 106/22 |
| 5,370,731 | 12/1994 | Yamashita et al. | 106/22 N |
| 5,382,283 | 1/1995 | Yui et al. | 106/20 R |
| 5,441,561 | 8/1995 | Chujo et al. | 106/20 C |

FOREIGN PATENT DOCUMENTS

| | | |
|---|---|---|
| A-63-139963 | 6/1988 | Japan . |
| A-2-97577 | 4/1990 | Japan . |
| B2-3-48950 | 7/1991 | Japan . |
| B2-3-48954 | 7/1991 | Japan . |
| A-4-239067 | 8/1992 | Japan . |
| A-5-17712 | 1/1993 | Japan . |
| A-7-102201 | 4/1995 | Japan . |

*Primary Examiner*—Edward J. Cain
*Attorney, Agent, or Firm*—Oliff & Berridge, PLC

[57] ABSTRACT

Ink-jet recording ink improved in releasability of bubbles and the like. The ink comprises water, a colorant and a water-soluble organic solvent. The surface tension of the ink at 20° C. is higher than the surface tension of a composition which comprises the components for the ink except the colorant. Ink-jet recording is effected by making use of the ink and, for example, a heating system.

20 Claims, No Drawings

INK-JET RECORDING INK AND INK-JET RECORDING METHOD USING THE SAME

BACKGROUND OF THE INVENTION

1. Field of the Invention

This invention relates to ink-jet recording ink and an ink-jet recording method using the same.

2. Description of Related Art

A so-called ink-jet system printer, which jets a liquid or fused solid ink from a nozzle, slit, porous film or the like and conducts recording on a paper, cloth, film or the like, has various advantages such as realization of small size, low cost and silent running. A large number of such printers are commercially available as printers for black or full color. Among such printers, a so-called piezo-ink-jet system printer using a piezoelectric device or a so-called thermal-ink-jet system printer which conducts recording by applying thermal energy act onto ink, thereby forming droplets has many advantages including the provision of high-speed printing and high resolution.

Ink-jet recording ink is requested to have many properties and among these properties, to provide a print image free from any defect is important regardless of printing speed and printing pattern.

To satisfy such a requirement, many attempts have so far been made and also put into practical use. For example, it is proposed in Japanese Patent Application Laid-Open (JP-A) No.63-139963 that ink is prepared so that the stability of foams (that is, the height of the remaining foams) after five minutes from start will become 0 mm as measured by the Ross-Miles Test in accordance with JIS K 3362. In Japanese Patent Application Laid-Open (JP-A) No. 2-97577, it is proposed that defect of a print image are prevented by specifying a nitrous acid concentration in ink as 0.2 ppm to 10 ppm. In Japanese Patent Application Laid-Open (JP-A) No. 5-17712, it is proposed that a dissolved gas in ink is removed by permeation through a gas permeation film. Japanese Patent Application Laid-Open (JP-A) No. 4-239067 suggests ink containing a surfactant having an HLB of from 10 to 20. In Japanese Patent Application Laid-Open (JP-A) No. 7-102201, it is proposed that for a specific ink cartridge, an amount of a surfactant added to ink is defined.

In the above exemplified methods, it is considered that the defect of a print image can be prevented to some extent by various actions. It cannot always be said that these methods can suppress the generation of bubbles or foams in the ink, which will cause the defect of a print image by disturbing the jet of the ink from a nozzle, satisfactorily.

Various causes for the generation of bubbles or foams in the passage for ink are known but those attributable to the ink can be classified roughly into the following three causes:

(1) The solubility of a gas represented by air in an aqueous liquid such as ink generally lowers with increase in temperature. Accordingly, when the temperature in the ink in the passage rises, the gas, or air, dissolved in the ink is discharged and becomes bubbles.

(2) When the wettability of the ink with the passage is inferior, air is trapped in the part of the passage inferior in the wettability and becomes bubbles.

(3) When the surface activity of the ink is high, the ink foams at the time of being mixed with outside air, thereby forming not easily removable foams.

It is, in fact, difficult to remove all of these causes ideally. Particularly in the thermal ink-jet system, ink is subjected to rapid heating by a heater and is then jetted by the pressure of the bubbles formed by boiling of the ink. Heat is then accumulated mainly in the vicinity of the heater, which tends to heighten the temperature of the ink in the passage. Consequently, it is particularly difficult to control the cause described above in (1).

In this way, it is difficult to prevent the very generation of bubbles or foams. Structural countermeasures are therefore generally taken, for example, by designing the structure of the passage so that the bubbles formed in the passage can be released spontaneously from a nozzle opening during printing or by providing a means for removing the bubbles compulsorily from the nozzle opening by suction or the like operation.

Even by the above-described countermeasures in the structure of the apparatus, however, it is in some cases impossible to suitably release and remove the bubbles or foams. Particularly, depending on the kind of the ink used, such defects are recognized frequently.

There remains another problem to be solved relating to a heater failure. Specifically, deposition (so-called kogation) onto the heater (i.e. a section where bubbles are formed and are allowed to grow by heating) generated by a temperature change causes short-frequency of a working electrode of the heater section, thereby making the heater unoperable.

Many proposals have been made as methods to prevent kogation. For example, it is proposed in Japanese Patent Application Publication (JP-B) No. 3-48950 to Japanese Patent Application Publication (JP-B) No. 3-48954, kogation can be prevented by reducing the amounts of iron, silicon, magnesium, calcium and the like in ink which originate from a dye contained therein. However, the kogation occurs depending on the chemical structure of the dye, even if the amount of these substances are reduced. There is accordingly a demand for the development of the ink which does not easily cause kogation even if various dyes are used as colorants.

SUMMARY OF THE INVENTION

An object of the present invention is to provide ink-jet recording ink which is excellent in releasability of bubbles, and therefore does not easily form defect in a printing image, and can provide excellent picture quality and jet stability.

Another object of the present invention is to provide ink-jet recording ink which makes it possible to reduce the kogation even if a dye is used as a colorant.

A further object of the present invention is to provide an ink-jet recording method using them.

The present inventors have conducted an eager investigation. As a result, it has been found that if a difference between the surface tension of ink and the surface tension of a composition which comprises the components for the ink except the colorant is allowed to fall within a fixed range, releasability of bubbles is improved and that in this case, kogation does not occur easily even if a dye is used as a colorant, leading to the completion of the present invention.

In a first aspect of the present invention, ink-jet recording ink comprising water, a colorant and a water-soluble organic solvent is higher in the surface tension at 20° C. compared with the surface tension of a composition which comprises the components for the ink except the colorant.

In the ink-jet recording ink according to the present invention, bubbles or foams, if generated, can be removed easily so that defects in a print image can be prevented even if high-speed printing is conducted or a print image having a high image density is printed successively.

When a dye is used as a colorant, kogation tends to occur generally. When the ink-jet recording ink according to the present invention is employed, on the contrary, kogation can be suppressed effectively and a life of a print head can be prolonged remarkably even if a dye is used as a colorant.

In a second aspect of the present invention, the above-described ink-jet recording ink is used in an ink-jet recording method wherein recording is conducted by jetting ink droplets from an orifice in accordance with a recording signal.

The present invention will hereinafter be described while reference is made to the process how the present invention has been completed.

In general, in the case where the whole volume of bubbles is constant, the lower the surface activity of ink is, the larger the size of the bubbles becomes. When, for example, a large amount of a surfactant is added to the ink to heighten the surface activity of the ink, on the other hand, the size of the bubbles becomes small and the number of the bubbles increases. The present inventors first paid attention to the size of the bubbles upon considering the releasability of the bubbles, and found that a great improvement in the releasability of the bubbles can be attained and defects in a print image at the time of printing can be drastically reduced when the bubbles in the ink each has an appropriate size and stability upon removal of the bubbles from an ink passage portion. As a result of the observation of the condition of the bubbles released from a nozzle, the following tendencies could be found:

(1) when the bubbles formed were small in size and large in number, some bubbles tended to remain in the passage without being released;

(2) when the bubbles showed an excessive increase in size, they blocked up the passage or broke at the time of removal thereof and therefore could not be removed completely; and (3) when the bubbles had an appropriate size, they did not break and could be removed easily.

The higher the recording resolution, for example, as high as 400 dpi (dots/inch) or 600 dpi rather than about 300 dpi and the smaller the passage size, the more eminent such tendencies. There are known various types of ink-jet recording apparatus but the above-described tendencies are eminent when the apparatus has a removable ink cartridge.

Furthermore, the present inventors studied the relationship between the condition of the bubbles in the passage such as size and amount and releasability of the bubbles; and the ink composition and physical properties. As described above, it is presumed that the size, amount and the like of the bubbles are controlled by the surface activity of the ink. Thus, the surface tension, wettability and contact angle of the ink and also the foam height and defoamability according to the Ross-Miles method, said properties being regarded as representative standards for the surface activity of the ink, were studied first but no close relationship or correspondence as described above could be found from such macroscopic physical indications.

The present inventors however have found an indication which has never been taken into consideration by those skilled in the art (specifically, the difference between the surface tension of the ink and the surface tension of a composition comprising the components for the ink except the colorant and found that when the difference falls within a specific range, the releasability of the bubbles becomes superior, thereby completed the present invention.

It is presumed that on the surface layer, that is, the vapor/liquid surface of the bubble in the ink, there concentratedly exist substances, among the ink components, having simultaneously a hydrophobic structure and a hydrophilic structure. The size of the bubbles or dynamic properties on the surface layer of the bubbles are considered to be largely influenced by the above-described chemical structure and the concentration of such substances. The above-described indication can be interpreted as an indication of interaction between the colorant and other components in the ink composition, and would reflect properties on the surface layer of the bubbles. It is considered that the indication satisfies the essential characteristics of the present invention, bubbles having a size suitable for defoaming appear. However, the mechanism is not clear.

Concerning the reduction in kogation, it is presumed that control of kogation is effected when a dye, which is a colorant in the ink and is a cause for kogation, is rendered to have appropriate interaction with other components in the ink.

DESCRIPTION OF THE PREFERRED EMBODIMENTS OF THE INVENTION

The present invention will hereinafter be described in detail by preferred embodiments.

A description will first be made of raw materials usable for the ink in the present invention.

A colorant as used herein includes a pigment and a dye. No particular limitation is imposed on the kind of the colorant usable in the ink according to the present invention insofar as it can satisfy essential characteristics of the present invention by being used in combination with other components. In the case of the dye, water-soluble dyes, particularly, direct dyes and acid dyes are particularly preferred from the viewpoint of quality which ink-jet ink originally has and also of more advantageous effects of the present invention.

The concentration of the dye in the ink is generally 0.1–10% by weight, preferably 0.3–8.0% by weight, more preferably 0.5–6.0% by weight.

Examples of the dye include Projet Cyan 1, Projet Magenta 1, Projet Magenta 1T and Projet Yellow 1G (trade names; products of Zeneca Pharmaceuticals); AE-SF VP344, Duasyn Brilliant Red F3 BSF VP 180 and Bayscript Yellow BG (trade names; products of Hoechst A. G.); Basacid Black X34 liquid, Basacid Black X38 liquid, Basacid Red 495 liquid, Basacid Blue 752 liquid, Basacid Blue 624 liquid, Basacid Blue 765 liquid, Basacid Yellow SE0840 liquid, Basacid Yellow SE0173 liquid and Basacid Yellow 099 liquid (trade names; products of BASF), Special Black SP liquid and Special Black HF (trade names; products of Bayer A.G.); C.I. Direct Black-4, -9, -11, -17, -19, -22, -32, -80, -151, -154, -168, -171, -194 and -195; C.I. Direct Blue-1, -2, -6, -8, -22, -34, -70, -71, -76, -78, -86, -142, -199, -200, -201, -202, -203, -207, -218, -236 and -287; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189 and -227; C.I. Direct Yellow-1, -2, -4, -8, -11, -12, -26, -27, -28, -33, -34, -41, -44, -48, -86, -87, -88, -135, -142 and -144; C.I. Food Black-1 and -2; C.I. Acid Black-1, -2, -7, -16, -24, -26, -28, -31, -48, -52, -63, -107, -112, 118, -119, -121, -172, -194 and -208; C.I. Acid Blue-1, -7, -9, -15, -22, -23, -27, -29, -40, -43, -55, -59, -62, -78, -80, -81, -90, -102, -104, -111, -185 and -254; C.I. Acid Red-1, -4, -8, -13, -14, -15, -18, -21, -26, -35, -37, -52, -249 and -257; and C.I. Acid Yellow-1, -3, -4, -7, -11, -12, -13, -14, -19, -23, -25, -34, -38, -41, -42, -44, -53, -55, -61, -71, -76 and -79. Of these dyes, a dye which has a comparatively large molecular weight or contains a carboxylic acid group in a soluble group in the dye molecule and which has favourable water resistance is more effective. Examples of such a dye include C.I. Direct Black-19, -154, -168, -194 and -195; C.I. Direct Blue-86 and -199; and C.I. Direct Red-110, -189 and -227; and C.I. Direct Yellow-41, -44, -48, -86, -87, -88, -135, -142 and -144.

From the viewpoint of obtaining more eminently advantageous effects of the present invention, it is preferred to employ a sufficiently purified dye, that is, so-called "ink-jet-grade dye".

When a pigment is used as a colorant, the amount thereof in the ink is generally 0.1–10.0% by weight, preferably 0.3–8.0% by weight, more preferably 0.5–6.0% by weight. Examples of the pigment include carbon black, Brilliant Carmine BS, Lake Carmine FB, Brilliant Fast Scarred, Diazo Yellow, Permanent Red R, Fast Yellow 10G, Phthalocyanine Blue, Blue Lake, Yellow Lake and Rohdamine Lake.

The water-soluble organic solvent used for the ink according to the present invention is added mainly to adjust the drying rate of the ink or to accelerate the dissolution of the colorant. Insofar as it is a water-soluble organic solvent which can satisfy essential characteristics of the present invention by being used in combination with other components, it can be used. Examples include polyhydric alcohols such as ethylene glycol, diethylene glycol, propylene glycol, butylene glycol, triethylene glycol, 1,2,6-hexanetriol, thiodiglycol and glycerin; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, and diethylene glycol monobutyl ether; basic solvents such as pyrrolidone, N-methyl-2-pyrrolidone, cyclohexyl pyrrolidone and triethanolamine; and alcohols such as ethanol, isopropyl alcohol, butyl alcohol and benzyl alcohol.

The water-soluble organic solvent concentration of the ink is generally 0.5–50% by weight, preferably 1–40% by weight, more preferably 3–30% by weight. When the concentration is smaller than 0.5% by weight, clogging tends to occur and in addition, permeability improving effects cannot be obtained. When the concentration is larger than 50% by weight, the viscosity of the ink increases, leading to a problem in the jet from the nozzle and bleeding tends to become conspicuous on paper. Therefore, the concentration outside the above range is not preferred. The water-organic solvents can be used either singly or in combination. When used in combination, they may fall within the above range in total.

It is preferred to add a surfactant to the ink of the present invention in order to heighten the wettability with paper or to obtain a full color print image without bleeding between colors even on so-called plain paper such as copy paper and plain paper. As the surfactants, nonionic, anionic and amphoteric surfactants are usable; however, nonionic surfactants are particularly preferred. Examples of the nonionic surfactant include polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, fatty acid alkylolamide and acetylene alcohol ethylene oxide adducts.

Examples of the anionic surfactants include alkylbenzene sulfonates, alkylphenyl sulfonates, alkylnaphthalene sulfonates, formalin condensates of alkylnaphthalene sulfonates, higher fatty acid salts, sulfate ester salts of a higher fatty acid ester, sulfonate salts of a higher fatty acid ester, sulfate ester salts of a higher alcohol ether, sulfonate salts of a higher alcohol ether, higher alkylsulfone sulfone amide, sulfosuccinic acid ester salts. Usable examples of the amphoteric surfactant include betaine, sulfobetaine and sulfate betaine.

The surfactant may contain from 0.01% by weight to 1.5% by weight, preferably 0.02% by weight to 1.2% by weight. The contents larger than 1.5% by weight tend to cause clogging and also bleeding of the print image so that they are not preferred. On the other hand, the concentration smaller than 0.01% by weight do not bring about sufficient surface activating effect. These surfactants may be used either singly or in combination. When used in combination, they may fall within the above-described range in total.

As water in the ink of the present invention, it is preferred to use ion exchange water, ultra pure water or distilled water with a view to preventing impurities from being mixed in the ink.

The ink according to the present invention is prepared by mixing the components as described above. Upon preparation, the surface tension of the ink at 20° C. is made higher than that of a composition of the components for the ink except the colorant, by properly selecting the kind of the components to be used in combination and by adjusting their contents. This may be attached by selecting the kind and composition of the essential components, by adding a specific kind of surfactant (besides, other component(s) to be added, which will be described later) in a specific proportion, or the like.

For instance, the dyes given as the preferred example can be used conveniently not only for the advantageous effects of the present invention but also for the preparation of the ink of the present invention.

A more specific description will next be made of the preferred embodiments.

Preferred examples of the colorant include water-soluble dyes, particularly acid dyes and direct dyes. They are desired to have a chemical structure or property coming under any one of the following:

(i) having a molecular weight of about 500 or higher, (ii) having at least one carboxylic acid per molecule, and (iii) having a laterally symmetric dye structure.

As the water-soluble organic solvent, any of those exemplified above is preferred. Particularly, eminently advantageous effects are brought about when at least one polyhydric alcohol derivative and in addition, at least one surfactant are contained. As the surfactant, a nonionic surfactant is particularly preferred. It is desired that they have at least a concentration of CMC (critical micell concentration) in the ink. The essential characteristics of the present invention can be satisfied by using them in combination.

The difference between the surface tension of the ink at 20° C. and the surface tension of a composition which comprises the components for the ink except the colorant is adjusted to at least 1.0 mN/m, preferably at least 1.5 mN/m in order to heighten the advantageous effects of the present invention. For that purpose, preferred is the use of the above-exemplified surfactant and water-soluble organic solvent, particularly, a polyhydric alcohol derivative such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, propylene glycol methyl ether, dipropylene glycol methyl ether, tripropylene glycol methyl ether or propylene glycol butyl ether; a basic solvent such as 2-pyrrolidone, N-methyl-2-pyrrolidone, cyclohexyl pyrrolidone or triethanolamine; or an alcohol such as ethanol, isopropyl alcohol, butyl alcohol or benzyl alcohol; or sulfolane.

If the surface tension of the ink falls within a range of from 30 mN/m to 50 mN/m at 20° C., large effects for improving the releasability of the bubbles can be obtained, the reason for which is not clear.

It is possible to add, to the ink of the present invention, a water-soluble polymer which contains as a monomer component acrylic acid, methacrylic acid or maleic acid or a salt thereof, a polyethylene imine, a polyamine, polyvinyl pyrrolidone, polyethylene glycol, a cellulose derivative, cyclodextrin, a large ring amine, a crown ether, urea or acetamide. It is also possible to add a pH buffer, a biocide, a viscosity controller, a conductivity imparting agent and/or the like as needed. In this case, however, it is necessary to satisfy the before-described requirement that the surface tension of the ink at 20° C. is higher than that of a composition comprising the components for the ink except the colorant.

The ink according to the present invention can be used in any one of ink-jet apparatuses, for example, piezo system, heating system, and the like apparatuses. The present invention is more effective when the diameter of the nozzle section falls within a range of from 5 $\mu$m to 100 $\mu$m, particularly from 10 $\mu$m to 70 $\mu$m.

Incidentally, when a novel ink is prepared, it can be evaluated by judging whether its surface tension satisfies the characteristics defined in the present invention.

EXAMPLE

The present invention will hereinafter be described in further detail by Examples.

Examples 1–9 and Comparative Examples 1–3

Components as shown in Table 1 were mixed by sufficient stirring, followed by pressure filtration through a 0.2 $\mu$m filter, whereby inks according to the present invention and inks not according to the present invention were prepared. In a similar manner except that the colorant was replaced by the same amount of ultra pure water, respective liquid compositions were prepared.

The following tests were made on each ink thus obtained.
(1) Surface tension of the ink The surface tension of the ink was measured by a Wilhelmy's surface tensionmeter under the environment at 20° C. and 50% RH.

(2) Printing test

Two types of printers experimentally made (thermal ink-jet system, 300 dpi [nozzle diameter: 50 $\mu$m], and 600 dpi [nozzle diameter: 30 $\mu$m]) were used to print 200 sheets of A-4 size paper successively, in a pattern including solid images and character images. The number of defects in the print image was counted and evaluation was conducted according to the following standards A: occurrence at less than 0.1 time/sheet
B: occurrence at 0.1 time or more/sheet but less than 0.3 time/sheet
C: occurrence at 0.3 time or more/sheet
In this test, A and B each falls within a permissible range.

(3) Head kogation test

Using a thermal ink-jet system printer having a resolution of 300 dpi experimentally made for the evaluation of the ink prepared, fluctuations in the jetted amount of the ink were measured during the jet conducted at $1\times10^8$ pulse.

A: fluctuations in the jetted amount of less than 5%
B: fluctuations in the jetted amount of 5% or higher but less than 10%
C: fluctuations in the jetted amount of 10% or higher
In this case, A and B each falls within a permissible range.

TABLE 1

| | | Components | |
|---|---|---|---|
| | Water-soluble dye (% by weight) | Water-soluble organic solvent (% by weight) | Surfactant (% by weight) |
| Ex. 1 | C.I. Direct Yellow 144 2.0 | Diethylene glycol 10.0 Diethylene glycol monobutyl ether 5.5 | Surfinol 465 1.0 |
| Ex. 2 | C.I. Direct Black 168 2.5 C.I. Direct Blue 199 0.5 | Glycerin 11.0 | HO(C$_2$H$_4$O)$_a$(C$_3$H$_6$O)$_b$(C$_2$H$_4$O)$_c$H (oxypropylene block having a molecular weight of 1,800, an oxyethylene content of 20% and an average molecular 2,250) 0.8 |
| Ex. 3 | C.I. Direct Black 168 4.0 | Ethylene glycol 15.0 Diethylene glycol monobutyl ether 8.0 | Polyoxyethylene oleyl ether 0.1 |
| Ex. 4 | C.I. Direct Black 154 1.0 C.I. Direct Black 195 3.0 | 2-Pyrrolidone 5.0 Diethylene glycol monobutyl ether 4.0 | Surfinol 465 0.05 |
| Ex. 5 | C.I. Acid Red 52 2.5 | Glycerin 11.0 | Polyoxyethylene oleyl ether 1.0 |
| Ex. 6 | Special Black HF Liquid (Bayer A.G.) 15.0 | Glycerin 11.0 Isopropyl alcohol 2.5 | Polyoxyethylene oleyl ether 0.1 |
| Ex. 7 | C.I. Direct Black 168 3.5 | Diethylene glycol 5.5 Diethylene glycol monobutyl ether 7.0 | Perfluoroalkyl ethylene oxide adduct 0.5 |
| Ex. 8 | Special Black HF Liquid (Bayer A.G.) 15.0 | 1,5-pentanediol 10 Isopropyl alcohol 1.5 | |
| Ex. 9 | C.I. Acid Red 52 2.5 | Sulfolan 20.0 Diethylene glycol monobutyl | Polyoxyethylene oleyl ether 0.1 |

TABLE 1-continued

| | Components | | |
|---|---|---|---|
| | Water-soluble dye (% by weight) | Water-soluble organic solvent (% by weight) | Surfactant (% by weight) |
| Comp. Ex. 1 | C.I. Acid Blue 9 2.0 | ether 8.0<br>2-pyrrolidone 5.0<br>Diethylene glycol 10.0<br>Diethylene glycol monobutyl ether 5.5 | Surfinol 465 1.0 |
| Comp. Ex. 2 | C.I. Acid Red 52 2.5 | Glycerin 11.0 | $HO(C_2H_4O)_a(C_3H_6O)_b(C_2H_4O)_cH$ (oxypropylene block having a molecular weight of 1,800, an oxyethylene content of 20% and an average molecular 2,250) 0.8 |
| Comp. Ex. 3 | Special Black SP Liquid (Bayer A.G.) 15.0 | Diethylene glycol 10.0<br>Diethylene glycol monobutyl ether 10.0 | |

Note) Ultra-pure water was added as the balance to give a total weight of 100% by weight.
Ex.: Example
Comp.: Comparative

TABLE 2

| | Surface tension (mN/m) (20° C.) | | Image defects test | | | |
|---|---|---|---|---|---|---|
| | Ink | Without coloring material | Prototype of 300 dpi | Prototype of 600 dpi | Head kogation test | Remarks |
| Ex. 1 | 31.0 | 29.0 | A | A | A | |
| Ex. 2 | 37.0 | 35.0 | A | A | A | |
| Ex. 3 | 39.5 | 38.0 | A | A | A | |
| Ex. 4 | 37.0 | 35.0 | A | A | A | |
| Ex. 5 | 39.2 | 38.0 | A | A | A | |
| Ex. 6 | 43.5 | 42.0 | A | A | A | |
| Ex. 7 | 29.0 | 28.0 | A | A | A | Bubbles remaining in the passage were observed (in the prototype of 600 dpi) |
| Ex. 8 | 51.0 | 50.0 | A | A | A | Bubbles remaining in the passage were observed (in the prototype of 600 dpi) |
| Ex. 9 | 37.0 | 35.0 | A | A | A | |
| Comp. Ex. 1 | 29.0 | 29.0 | A | C | B | |
| Comp. Ex. 2 | 35.0 | 35.0 | C | C | B | |
| Comp. Ex. 3 | 35.0 | 35.0 | C | C | C | |

As is apparent from the above results, the ink-jet recording ink according to the present invention is free from defective images caused by defect and also free from the occurrence of kogation. When the difference between the surface tension of the ink and the surface tension of a composition which comprises the components for the ink except the colorant is at least 1.0 mN/m, particularly good results can be obtained.

What is claimed is:

1. Ink-jet recording ink comprising water, a colorant and a water-soluble organic solvent, wherein the surface tension of the ink at 20° C. is higher than the surface tension of a composition which comprises the components for the ink except the colorant.

2. The ink-jet recording ink according to claim 1, wherein the difference between the surface tension of the ink and the surface tension of the composition comprising the components for the ink except the colorant is at least 1.0 mN/m.

3. The ink-jet recording ink according to claim 1, wherein the surface tension of the ink is 30–50 mN/m at 20° C.

4. The ink-jet recording ink according to claim 2, wherein the surface tension of the ink is 30–50 mN/m at 20° C.

5. The ink-jet recording ink according to claim 1, wherein the colorant is a dye.

6. The ink-jet recording ink according to claim 5, wherein the dye is a water-soluble dye.

7. The ink-jet recording ink according to claim 6, wherein the water-soluble dye is at least one selected from the group consisting of acid dyes and direct dyes.

8. The ink-jet recording ink according to claim 1, further comprising a surfactant.

9. The ink-jet recording ink according to claim 8, wherein the surfactant is at least one selected from the group consisting of nonionic surfactants, anionic surfactants and amphoteric surfactants.

10. The ink-jet recording ink according to claim 9, wherein the surfactant is at least one nonionic surfactant.

11. The ink-jet recording ink according to claim 10, wherein the surfactant is added in an amount of 0.01% by weight to 1.5% by weight.

12. Ink-jet recording ink comprising 0.1% by weight to 10% by weight of a colorant, 0.5% by weight to 50% by weight of a water-soluble organic solvent, 0.01% by weight to 1.5% by weight of a surfactant and the balance of water, and having a surface tension at 20° C. higher than the surface tension of a composition which comprises the components for the ink except the colorant.

13. The ink-jet recording ink according to claim 12, wherein the colorant is a water-soluble dye.

14. The ink-jet recording ink according to claim 13, wherein the water-soluble dye has a feature selected from the group consisting of the following:

(i) having a molecular weight of about 500 or higher, (ii) having at least one carboxylic acid per molecule, and (iii) having a laterally symmetric chemical structure.

15. The ink-jet recording ink according to claim 14, wherein the difference between the surface tension of the ink and the surface tension of the composition which comprises the components for the ink except the colorant is at least 1.0 mN/m.

16. The ink-jet recording ink according to claim 15, wherein the surface tension of the ink is 30 mN/m to 50 mN/m at 20° C.

17. An ink-jet recording method for conducting recording by jetting ink droplets from an orifice according to a recording signal, wherein employed as ink is an ink-jet recording ink which comprises water, a colorant and a water-soluble organic solvent and has a surface tension of the ink at 20° C. higher than the surface tension of a composition comprising the components for the ink except the colorant.

18. The ink-jet recording method according to claim 17, wherein the difference between the surface tension of the ink and the surface tension of the composition comprising the components for the ink except the colorant is at least 1.0 mN/m.

19. The ink-jet recording method according to claim 17, wherein the surface tension of the ink is 30 mN/m to 50 mN/m at 20° C.

20. The ink-jet recording method according to claim 17, wherein the ink is jetted by using a heating system.

* * * * *